United States Patent
Sawert et al.

(10) Patent No.: US 7,555,946 B2
(45) Date of Patent: Jul. 7, 2009

(54) SEALED FUEL LEVEL SENSORS

(75) Inventors: Ulf Sawert, Grand Blanc, MI (US); Hugh Ireland, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/737,543

(22) Filed: Apr. 19, 2007

(65) Prior Publication Data
US 2007/0214882 A1 Sep. 20, 2007

Related U.S. Application Data

(63) Continuation-in-part of application No. 10/929,181, filed on Aug. 30, 2004, now abandoned.

(51) Int. Cl.
*G01F 23/56* (2006.01)
(52) U.S. Cl. .................. 73/305; 73/290 R; 73/314; 73/317; 73/322.5
(58) Field of Classification Search .............. 73/313, 73/314, 317, 290 R, 291, 301, 304 R, 305, 73/309, 311, 322.5
See application file for complete search history.

(56) References Cited

U.S. PATENT DOCUMENTS

| | | | |
|---|---|---|---|
| 4,318,075 A | | 3/1982 | Pudelko et al. |
| 4,494,407 A | * | 1/1985 | Allemano ............. 73/300 |
| 4,532,491 A | * | 7/1985 | Rau et al. ............. 338/33 |
| 4,827,769 A | * | 5/1989 | Riley et al. ........... 73/313 |
| 5,284,055 A | * | 2/1994 | Baux et al. ........... 73/317 |
| 5,315,563 A | * | 5/1994 | Lichtenfels et al. ...... 367/99 |
| 5,341,679 A | * | 8/1994 | Walkowski et al. ...... 73/317 |
| 5,642,715 A | | 7/1997 | Yamakawa et al. |
| 5,746,088 A | | 5/1998 | Sawert et al. |
| 5,785,032 A | | 7/1998 | Yamashita et al. |
| 6,021,668 A | | 2/2000 | Sawert et al. |
| 6,047,685 A | | 4/2000 | Schelhas et al. |
| 6,168,713 B1 | | 1/2001 | Sekine et al. |

(Continued)

FOREIGN PATENT DOCUMENTS

BR  PI9202351-7   1/1994

(Continued)

*Primary Examiner*—Hezron Williams
*Assistant Examiner*—Samir M Shah
(74) *Attorney, Agent, or Firm*—Paul L. Marshall

(57) ABSTRACT

A sealed fuel level sensor for a fuel tank is provided. The sealed fuel level sensor includes a frame having a cavity therein. The sealed fuel level sensor further includes a variable resistor disposed in the cavity and operatively supported by the frame. The sealed fuel level sensor further includes a wiper disposed in the cavity for rotation relative to the variable resistor and for contacting the variable resistor. The sealed fuel level sensor further includes a cover connected to the frame to enclose the cavity. The cover includes an aperture extending therethrough. The sealed fuel level sensor further includes a bushing disposed within the aperture. The bushing having a body portion and a lip seal portion disposed on the body portion. The lip seal portion and the body portion having a bore therein. The sealed fuel level sensor further includes a float arm having an end extending through the aperture of the cover and the bore of the bushing and connected to the wiper. The lip seal portion engages the float arm to form a seal.

11 Claims, 4 Drawing Sheets

U.S. PATENT DOCUMENTS

| | | |
|---|---|---|
| 6,206,035 B1 | 3/2001 | Wehner et al. |
| 6,209,392 B1 * | 4/2001 | Rapala ........................ 73/317 |
| 6,216,671 B1 | 4/2001 | Sawert et al. |
| 6,382,190 B1 | 5/2002 | Tanabe et al. |
| 6,453,870 B1 | 9/2002 | Koller et al. |
| 6,505,644 B2 | 1/2003 | Coha et al. |
| 6,564,631 B1 * | 5/2003 | Lake et al. .................... 73/313 |
| 6,679,227 B2 | 1/2004 | Sawert et al. |
| 6,732,584 B2 * | 5/2004 | Rapala ........................ 73/313 |
| 6,851,315 B2 * | 2/2005 | Bergsma et al. ................ 73/317 |
| 6,868,724 B2 * | 3/2005 | Brzozowski et al. .......... 73/317 |
| 2002/0040597 A1 * | 4/2002 | Sawert et al. ................. 73/317 |
| 2002/0124833 A1 | 9/2002 | Fauser et al. |
| 2004/0163467 A1 * | 8/2004 | Tanaka et al. ................. 73/313 |

FOREIGN PATENT DOCUMENTS

| | | |
|---|---|---|
| DE | 3627116 A1 | 2/1988 |
| WO | WO0060231 | 10/2000 |

* cited by examiner

SEALED FUEL LEVEL SENSORS

CROSS-REFERENCE TO RELATED APPLICATIONS

The present application is a continuation-in-part of U.S. patent application Ser. No. 10/929,181 filed Aug. 30, 2004, the contents of which are incorporated herein by reference thereto.

BACKGROUND

The present application relates generally to fuel sensors for vehicles and, more particularly, to a sealed fuel level sensor for a vehicle.

It is known to provide a fuel level sensor in a fuel tank of a vehicle to sense or indicate a level of fuel in the fuel tank. Examples of such fuel level sensors are disclosed in U.S. Pat. No. 5,746,088, U.S. Pat. No. 6,021,668, and U.S. Pat. No. 6,681,628. Typically, the fuel level sensor includes a ceramic resistor card operatively connected to structure for a fuel module and a wiper assembly pivotally connected to the structure for engaging the resistor card. The wiper assembly has one end connected to a float arm and a float member to rotate the wiper assembly relatively to the resistor card based on a level of fuel in the fuel tank.

Thick film ceramic fuel level sensors are open and exposed to fuel in the fuel tank. These fuel level sensors typically employ silver (Ag) based conductive inks (Ag, Pd, Pt) and high content Ag contacts (Paliney6, Ag/Ni). These materials function in fuels that contain moderate sulfur levels or that are low in alcohol content. These materials have also allowed manufacturers to produce a cost effective fuel level sensor.

Fuel level sensors that are open and exposed to fuels have always been susceptible to solid contaminates such as, for example, sand, which can cause the sensor output to produce opens. As the sulfur level in fuels is reduced, smaller, more reactive compounds are more likely to be left behind in the fuel. Sulfination is a chemical reaction between Ag and sulfur. Natural aging of the ink/contact interfaces of the fuel level sensor exposes the silver in these components to sulfurs, producing a thin lacquer contamination. Silver based fuel level sensors produce opens or a shift in resistance when exposed to this extremely reactive fuel.

Also, as refineries introduce fuels with higher levels of alcohol, silver based fuel level sensors that are open or exposed to this fuel are more susceptible to plating, galvanic, or dendritic growth. Galvanic growth is a plating process which forms an insulating layer between the contacts and a working surface of the conductive ink, no matter if the materials are Ag based or Noble metals. Given enough powered exposure time, the output of the fuel level sensor will produce an open. Dendritic growth is a silver migration that will short out segments of the resistor of the fuel level sensor.

The inventors herein have recognized a need for an improved fuel level sensor that provides a sealing mechanism for a fuel level sensor assembly that is dimensionally stable when exposed to the harsh chemicals of fuel formulations and also permits free rotation of the float arm to thereby limit exposure of a variable resistor assembly in the fuel sensor to chemicals found in fuels to reduce particulate contamination, sulfination, and dendritic growth.

SUMMARY OF THE INVENTION

A sealed fuel level sensor for a fuel tank in accordance with an exemplary embodiment is provided. The sealed fuel level sensor includes a frame having a cavity therein. The sealed fuel level sensor further includes a variable resistor disposed in the cavity and operatively supported by the frame. The sealed fuel level sensor further includes a wiper disposed in the cavity for rotation relative to the variable resistor and for contacting the variable resistor. The sealed fuel level sensor further includes a cover connected to the frame to enclose the cavity. The cover includes an aperture extending therethrough. The sealed fuel level sensor further includes a bushing disposed within the aperture. The bushing having a body portion and a lip seal portion disposed on the body portion. The lip seal portion and the body portion having a bore therein. The sealed fuel level sensor further includes a float arm having an end extending through the aperture of the cover and the bore of the bushing and connected to the wiper. The lip seal portion engages the float arm to form a seal. The sealed fuel level sensor further includes a float connected to the float arm such that the float moves the float arm and the wiper relative to the variable resistor as a level of fuel increases and decreases in the fuel tank.

A sealed fuel level sensor for a fuel tank in accordance with another exemplary embodiment is provided. The sealed fuel level sensor includes a frame having a cavity therein. The sealed fuel level sensor further includes a variable resistor disposed in the cavity and operatively supported by the frame. The sealed fuel level sensor further includes a wiper disposed in the cavity for rotation relative to the variable resistor and for contacting the variable resistor. The sealed fuel level sensor further includes a cover connected to the frame to enclose the cavity. The cover includes an aperture extending therethrough. The sealed fuel level sensor further includes a bushing disposed within the aperture. The bushing has a metallic body portion and an elastomeric lip seal portion disposed on the body portion. The elastomeric lip seal portion and the metallic body portion have a bore therein. The sealed fuel level sensor further includes a float arm having an end extending through the aperture of the cover and the bore of the bushing and connected to the wiper. The elastomeric lip seal portion engages the float arm to form a seal. The sealed fuel level sensor further includes a float connected to the float arm such that the float moves the float arm and the wiper relative to the variable resistor as a level of fuel increases and decreases in the fuel tank.

A sealed fuel level sensor for a fuel tank in accordance with another exemplary embodiment is provided. The sealed fuel level sensor includes a frame having a cavity therein. The sealed fuel level sensor further includes a variable resistor disposed in the cavity and operatively supported by the frame. The sealed fuel level sensor further includes a wiper disposed in the cavity for rotation relative to the variable resistor and for contacting the variable resistor. The sealed fuel level sensor further includes a cover connected to the frame to enclose the cavity, the cover including an aperture extending therethrough. The sealed fuel level sensor further includes a bushing disposed within the aperture. The bushing has a body portion, a lip seal portion disposed on a first end of the body portion, and a flange portion disposed on a second end of the body portion. The lip seal portion and the body portion and the flange portion having a bore extending therethrough. The flange portion has a pair of posts extending outwardly to limit movement of a float arm. The float arm has an end extending through the aperture of the cover and the bore of the bushing and connected to the wiper. The lip seal portion engages the float arm to form a seal. The sealed fuel level sensor further includes a float connected to the float arm such that the float moves the float arm and the wiper relative to the variable resistor as a level of fuel increases and decreases in the fuel tank.

A sealed fuel level sensor for a fuel tank in accordance with another exemplary embodiment is provided. The sealed fuel level sensor includes a frame having a cavity therein. The sealed fuel level sensor further includes a variable resistor disposed in the cavity and operatively supported by the frame. The sealed fuel level sensor further includes a wiper disposed in the cavity for rotation relative to the variable resistor and for contacting the variable resistor. The sealed fuel level sensor further includes a cover connected to the frame to enclose the cavity. The cover includes an aperture extending therethrough. The cover has a pair of posts extending outwardly to limit movement of a float arm. The sealed fuel level sensor further includes a bushing disposed within the aperture. The bushing has a body portion and a lip seal portion disposed on the body portion. The lip seal portion and the body portion have a bore therein. The float arm has an end extending through the aperture of the cover and the bore of the bushing and connected to the wiper, the lip seal portion engaging the float arm to form a seal. The sealed fuel level sensor further includes a float connected to the float arm such that the float moves the float arm and the wiper relative to the variable resistor as a level of fuel increases and decreases in the fuel tank.

DESCRIPTION OF EXEMPLARY EMBODIMENTS

Figure 1:
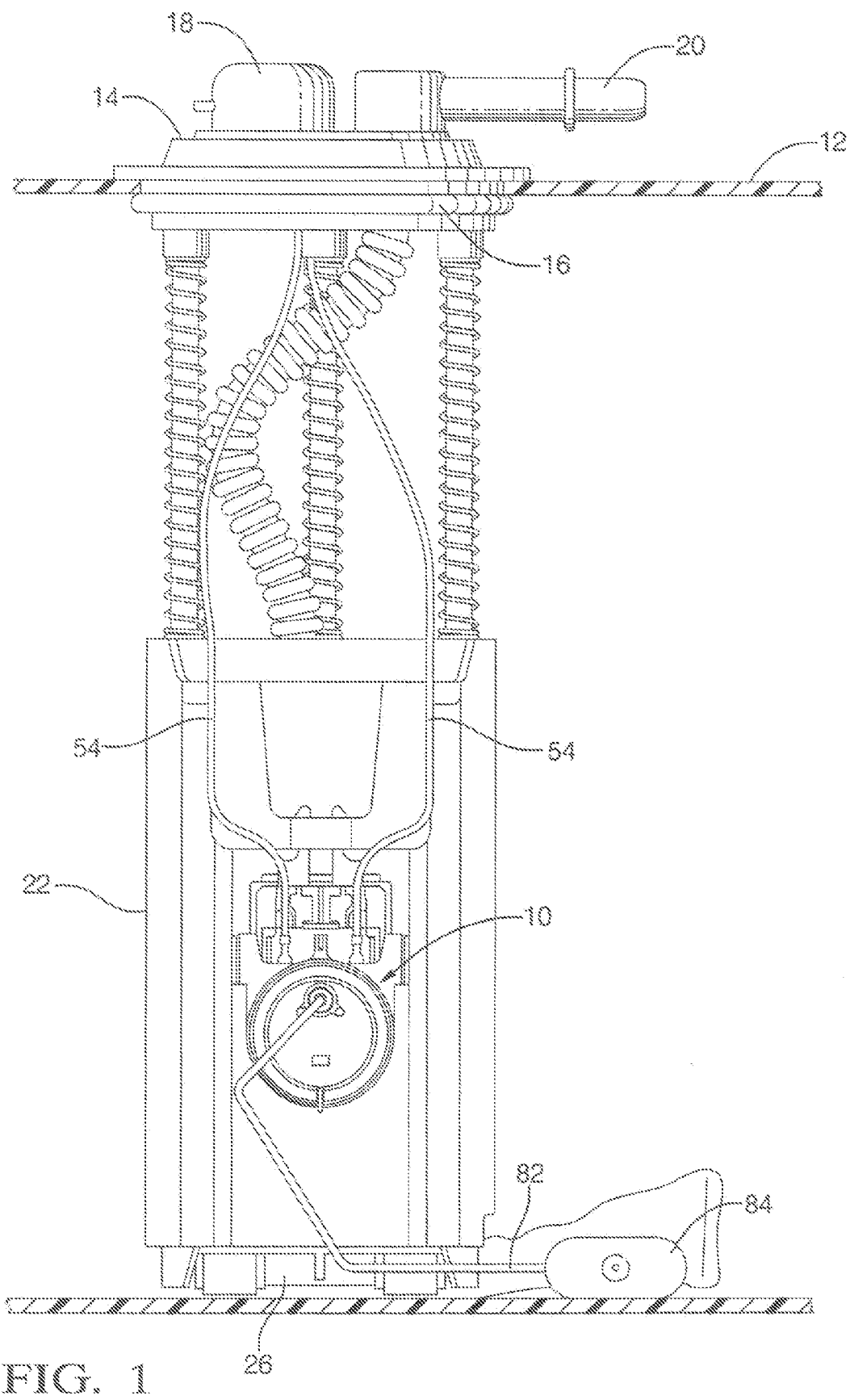
FIG. 1 is a fragmentary elevational view of an exemplary embodiment of a sealed fuel level sensor illustrated in operational relationship with a fuel tank.

Referring to the drawings and in particular FIG. 1, one exemplary embodiment of a sealed fuel level sensor 10, according to the present invention, is shown for a fuel tank 12 (partially shown) of a vehicle (not shown). The fuel tank 12 includes a fuel pump module 14 therein with a removable cover 16 sealed to the top of the fuel tank 12 with an electrical connector 18 and a fuel line outlet connector 20. The fuel tank 12 also includes a fuel reservoir 22 that contains an electrical fuel pump 24 with an inlet 26 and the sealed fuel level sensor 10 to indicate fuel level in the fuel tank 12.

Figure 2:
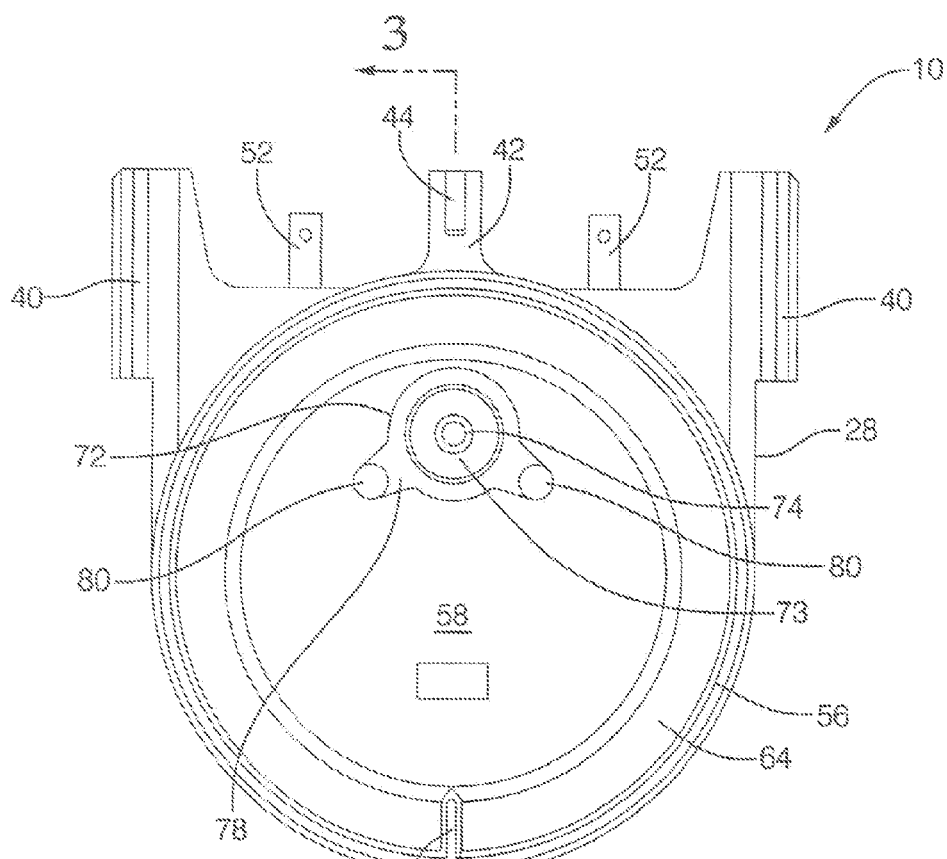
FIG. 2 is an enlarged elevational view of the exemplary sealed fuel level sensor of FIG. 1.
Figure 3:
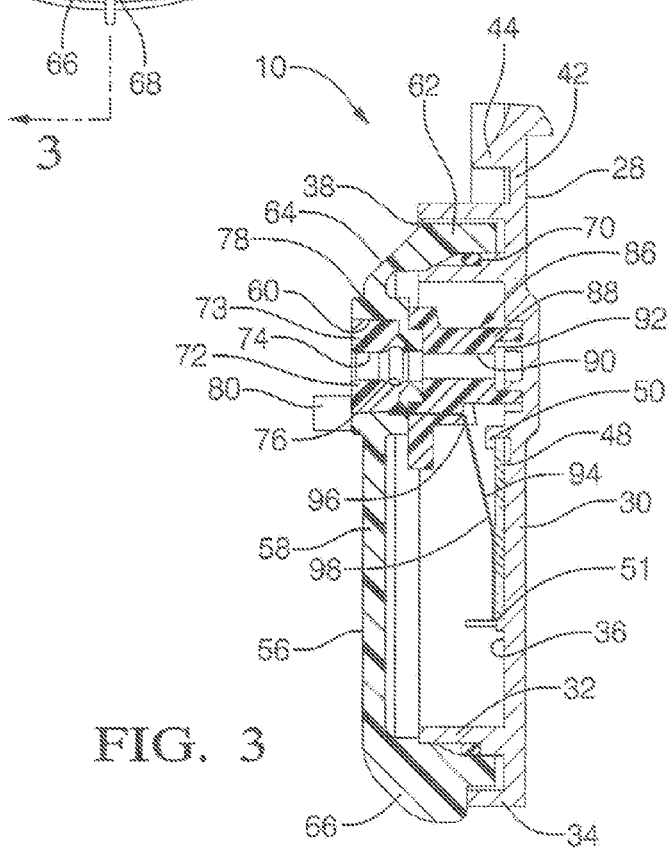
FIG. 3 is a sectional view taken along line 3-3 of FIG. 2.
Figure 4:
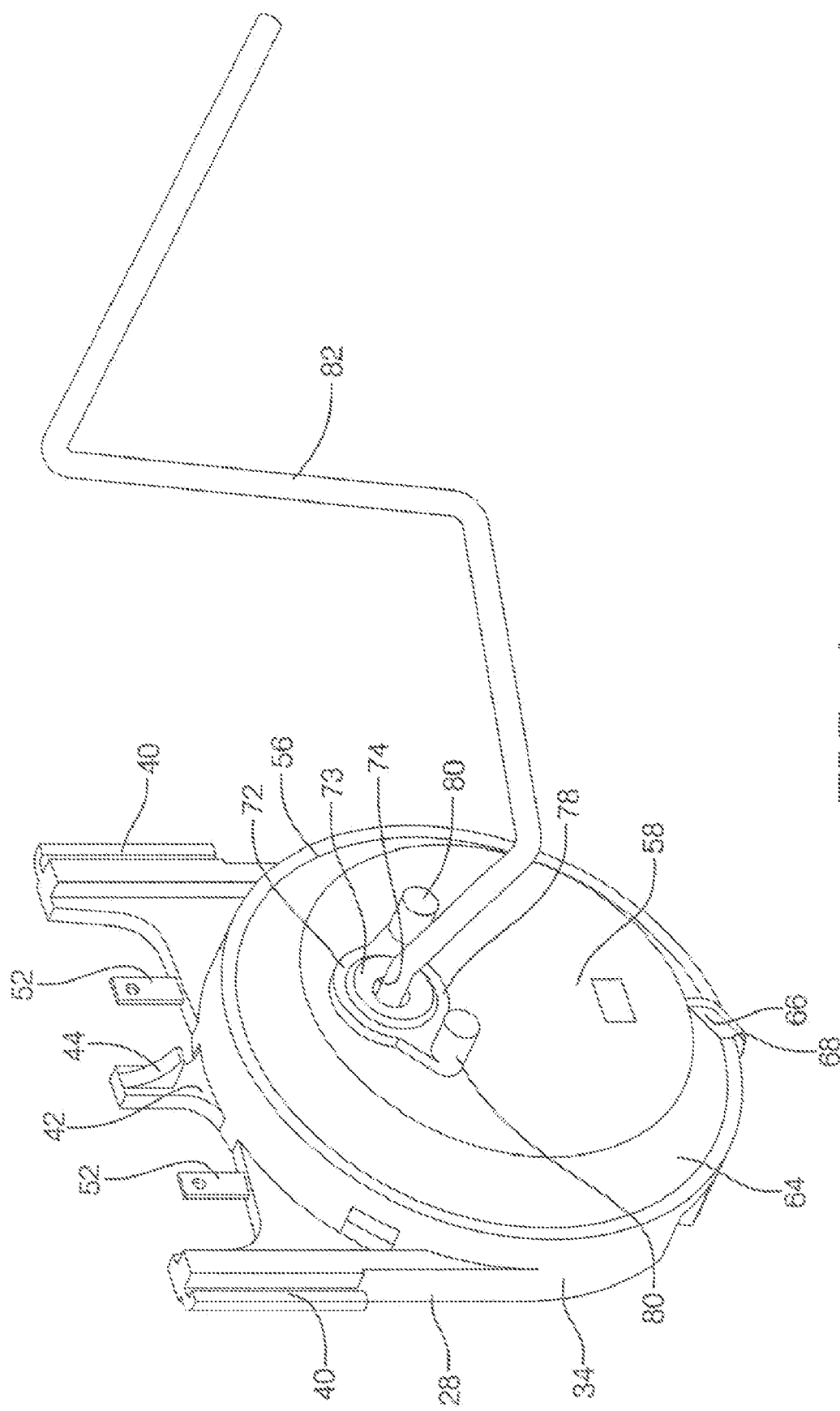
FIG. 4 is a perspective view of the exemplary sealed fuel level sensor of FIG. 1.

Referring to the exemplary embodiment illustrated in FIGS. 2 through 4, the sealed fuel level sensor 10 includes a frame 28 for connection to the fuel reservoir 22. The frame 28 has a base wall 30 and at least one, preferably a plurality of, side walls. The frame also has two sidewalls 32 and 34 generally perpendicular to the base wall 30. The first side wall 32 is generally annular in shape to form a cavity 36 to support a variable resistor 48 to be described. The cavity 36 has a generally circular shape. The second side wall 34 is generally annular in shape and spaced radially from the first side wall 32 to form a channel or groove 38 therebetween. The frame 28 also has a pair of arms 40 spaced laterally and extending longitudinally from the base wall 30. The frame 28 also has an extension 42 spaced laterally between the arms 40 and extending longitudinally. The extension 42 has a flange 44 extending axially from a free end thereof. The arms 40 and flange 44 extend through apertures (not shown) in the fuel reservoir 22 and the flange 44 prevents removal of the frame 28 from the aperture to suspend the frame 28 from the fuel reservoir 22. The frame 28 is made of a plastic material and formed as a monolithic structure being integral, unitary and one-piece.

The exemplary sealed fuel level sensor 10 also includes a variable resistor comprising a ceramic resistor card 48 operatively connected to the frame 28. The ceramic resistor card 48 has at least one bus portion (not shown), preferably a resistive bus portion (not shown) and a conductive bus portion (not shown) spaced from the resistive bus portion. The ceramic resistor card 48 also has a solder pad (not shown) at one end of the resistive bus portion and a solder pad (not shown) at one end of the conductive bus portion. The resistive bus portion extends over a predetermined angle, for example approximately sixty-five degrees, to provide a variable resistance corresponding to the fuel level in the fuel tank 12. It should be appreciated that the conductive bus portion is a common ground. It should also be appreciated that the solder pads provide connection points to be described.

The ceramic resistor card 48 is generally planar and rectangular in shape. The ceramic resistor card 48 is made of a ceramic material. The bus portions and solder pads are made of a conductive ink where contacts to be described ride on and are formed in generally arcuate pathways. The conductive ink is made of an alloy of silver (Ag).

The ceramic resistor card 48 is disposed in the cavity 36 of the frame 28 and abuts the base wall 30. The ceramic resistor card 48 is secured in place by a hold down projection 50 extending from the base wall 30 and into the cavity 36. The projection 50 has a generally inverted "L" cross-sectional shape and the ceramic resistor card 48 is disposed between the projection 50 and the base wall 30. In exemplary embodiments, the ceramic resistor card 48 can also be secured by a suitable mechanism such as soldering at 51.

The exemplary sealed fuel level sensor 10 includes at least one, preferably a plurality of, terminals 52 operatively supported by the frame 28. The terminals 52 are made of a conductive material. The terminals 52 are generally rectangular in shape. The terminals 52 are insert molded to the frame 28 and extend longitudinally from one end of the frame 28. The terminals 52 are electrically connected to the solder pads of the ceramic resistor card 48 and are connected by wires 54 (FIG. 1) to the electrical connector 18.

The exemplary sealed fuel level sensor 10 includes a cover 56 to enclose the cavity 36 of the frame 28. The cover 56 has a base wall 58 extends radially and has a generally circular shape. The base wall 58 also includes an aperture 60 extending axially therethrough and communicating with the cavity 36. The cover 56 includes a side wall 62 being generally annular and extending generally perpendicular from the base wall 58. The side wall 62 is disposed in the groove 38 of the frame 28 and secured thereto by a suitable mechanism such as press-fitting. The side wall 62 may include a chamfer 64 on an outer portion thereof. The side wall 62 may also include a projection 66 extending radially and axially. The projection 66 is disposed in a slot 68 of the second side wall 34 of the frame 28 to locate the cover 56 relative to the frame 28. The cover 56 is made of a plastic material and formed as a monolithic structure being integral, unitary and one-piece. In alternative exemplary embodiments, the cover 56 may allow a limited amount of fuel to enter the cavity 36.

The exemplary sealed fuel level sensor 10 includes a seal 70 disposed between the cover 56 and the frame 28. The seal 70 is generally annular and circular in cross-sectional shape. The seal 70 is of an o-ring type and made of an elastomeric material. The seal 70 is disposed in the groove 38 of the frame 28 between the side wall 62 of the cover 56 and the first side wall 32 of the frame 28.

The exemplary sealed fuel level sensor 10 also includes a bushing 72 disposed in the aperture 60 of the base wall 58. The bushing 72 has a shaft portion 73 extending axially. The shaft portion 73 is generally cylindrical in shape and has an aperture or bore 74 extending axially therethrough. The aperture 74 includes a lip seal portion 76 extending circumferentially about the aperture 74 to form a seal against a float arm 82 inserted into the bore. The bushing 72 includes a flange 78 extending outwardly from the shaft portion 73. The flange 78 is generally planar in shape and extends outwardly past the aperture 60 of the cover 56. The flange 78 includes a pair of posts 80 extending axially and spaced radially to limit movement of the flat arm 82. The bushing 72 is made of a conductive metal such as brass. The bushing 72 is formed as a monolithic structure being integral, unitary, and one-piece. It should be appreciated that the one-piece lip seal portion and bushing allows for ease of assembly. It should also be appreciated that the bushing 72 forms a seal around the float arm 82 while still allowing a wiper to be described to move freely in a dry environment.

As mentioned above, the exemplary sealed fuel level sensor 10 illustrated in FIGS. 2 through 4 includes a float arm 82 connected to the bushing 72. The float arm 82 is made of a metal material, such as a plated cold rolled steel for example. The float arm 82 is a rod that is bent with one end disposed in a cavity (not shown) of a float 84 and another end disposed in the aperture 74 of the bushing 72. The sealed fuel level sensor 10 includes a float 84 (FIG. 1) connected to the float arm 82. The float 84 is generally rectangular in shape and has a cavity (not shown) in one end to receive one end of the float arm 82. The float 84 is made of a floatable material having a density less than a density of the fuel. The float arm 82 is inserted through the bushing 72 and is press fit into a wiper assembly to be described, allowing for the rotation and function of the contacts on the conductive ink of the ceramic resistor card 48.

Referring to FIG. 3, the exemplary sealed fuel level sensor 10 includes a wiper assembly, generally indicated at 86, for cooperating with the ceramic resistor card 48 to provide a signal as to a level of fuel in the fuel tank 12. The wiper assembly 86 includes a shaft 88 disposed in the cavity 36 of the frame 28. The shaft 88 is generally cylindrical in shape. The shaft 88 has an aperture 90 extending axially therethrough. The aperture 90 has a groove 92 extending circumferentially about one end to receive a retainer (not shown) to prevent the float arm 82 from exiting the aperture 90 of the shaft 88.

The wiper assembly 86 includes a wiper 94 connected to the shaft 88 for contacting the ceramic resistor card 48. The wiper 94 has a base 96 that is generally arcuate in shape and connected to the shaft 88. The wiper 94 also has at least one, preferably a plurality of contact flex arms 98 formed by slots (not shown) spaced laterally and extending longitudinally therein. The contact flex arms 98 extend longitudinally and downward an at angle from the base 96. The contact flex arms 98 and base 96 are formed from a non-Noble metal such as copper. The contact flex arms 98 and base 96 are integral, unitary and formed as one-piece. The wiper 94 is preferably insert molded into the shaft 88 to retain the wiper 94 thereto. The wiper 94 also includes at least one, preferably a plurality of or multiple contacts (not shown) near a free end of each contact flex arm 98. The wiper 94 is operatively supported by the shaft 88. The contact flex arms 98 flex or deflect relative to the base 96.

During operation, the sealed fuel level sensor 10 is operatively connected to the fuel reservoir 22 of the fuel pump module 14 inside the fuel tank 12. Fuel inside the fuel tank 12 causes the float 84 to rise to the top thereof. The wiper 94 engages the bus portions of the ceramic resistor card 48. The contacts engage the bus portions and the contact flex arms 98 create a shorting bar between resistive and conductive paths on the ceramic resistor card 48 to provide a predetermined resistance when an electrical signal is sent by a controller (not shown) via the electrical connector 18 to indicate the level of fuel in the fuel tank 12. As the fuel level increases or decreases in the fuel tank 12, the float 84 is raised or lowered to rotate the wiper assembly 86 relative to the frame 28 via the float arm 82. As the wiper assembly 86 rotates, the wiper 94 rotates across the bus portions and the contacts move to different portions thereof to vary or provide a different predetermined resistance to indicate the level of fuel in the fuel tank 12. In exemplary embodiments, the wiper 94 has the ability to function in a five-volt (5 v), ten milliamp (10 mA) system.

Figure 5:
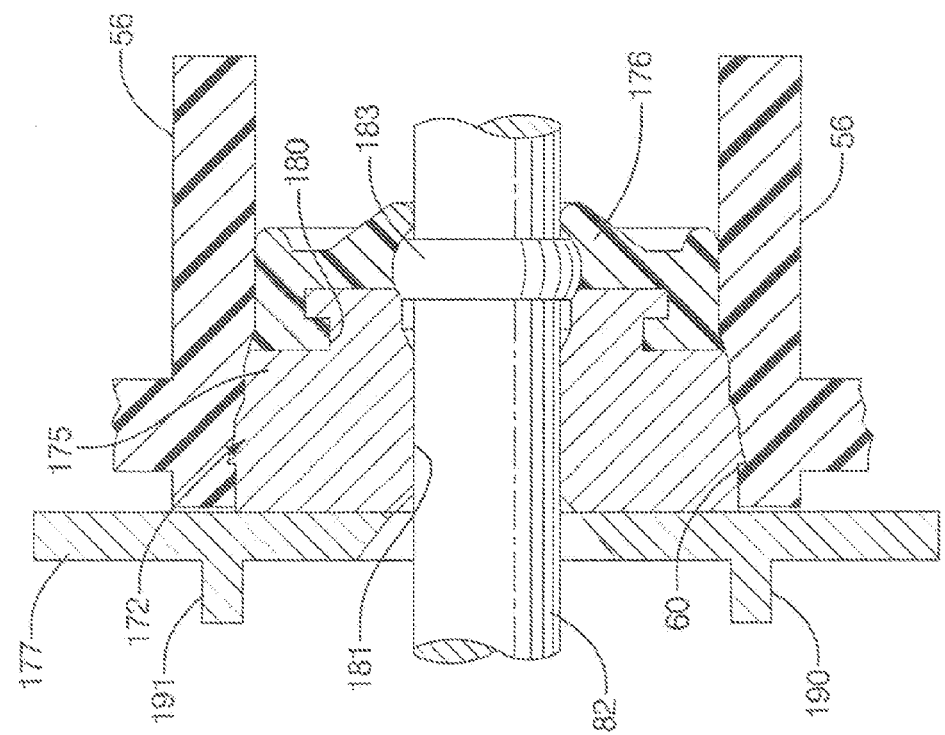
FIG. 5 is an enlarged, partial cross-sectional view of another exemplary embodiment of a composite bushing that can be incorporated into the sealed fuel level sensor of FIG. 1.

Referring now to FIG. 5, an enlarged, partial cross-sectional view of a bushing 172 that can be incorporated into an alternative exemplary embodiment of the sealed fuel level sensor 10 of FIGS. 1-4 is shown. The bushing 172 is provided to receive a portion of the rotating float arm 82 that is coupled to a wiper assembly and to prevent leakage from the fuel module into the variable resistor assembly. As with the bushing 72 in FIGS. 2-4, the bushing 172 is configured to be disposed at least partially in the aperture 60 of the cover 56 of the sealed fuel level sensor 10. The bushing 172 includes an annular, rigid body portion 175, an annular, elastomeric lip seal portion 176, a flange portion 177, and posts 190, 191. The lip seal portion 176 extends circumferentially about the aperture 60 and forms a seal against the float arm 82 inserted into a bore 181.

In an exemplary embodiment, the rigid body portion 175, the flange portion 177 and the posts 190, 191 are constructed from a material that exhibits dimensional stability when exposed to the harsh chemicals of fuel formulations. For example, the body portion 175, the flange portion 177, and the posts 190, 191 can be a unitary structure constructed from brass, carbon, stainless steels, bronze, aluminum, lead, polyamides, ceramics, or combinations thereof. In one exemplary embodiment, the body portion 175 has an undercut groove 180 thereon configured to receive a portion of the lip seal portion 176 therein for mechanically locking the body portion 176 to the lip seal portion 176.

The lip seal portion 176 is configured to receive an engagement flange 183 of the flax arm 82 and to form a relatively tight seal against the float arm 82 while allowing rotation of the float arm 82. The elastomeric lip seal portion 176 extends radially into the bore 181 to form a relatively tight seal with the float arm 82 above the engagement flange 183. The lip seal portion 176 is constructed from an elastomeric material. It should be noted that the elastomeric material can also be a polymeric material. The elastomeric material can have a wide temperature range and provide relatively good chemical resistance to gasoline, diesel fuels, and other fuel formulations. For example, the lip seal portion 176 can be constructed from one or more of flourocarbon elastomers (such as Viton. RTM., Technoflon.RTM., Flourel.RTM., and Kel-F.RTM.), hypalon, flourosilicones, nitriles (such as Buna-N, Hydroginated Nitrile, and Carboxylated Nitrile), epichlorohydrin, perflouroelastomer, or combinations thereof.

A strong bond between the rigid body portion 175 and the elastomeric lip seal portion 176 of the composite bushing 172 can be achieved with mechanical bonding and/or chemical adhesive. For example, in one exemplary embodiment, the rigid body portion 175 is mechanically joined by injection-molding or press-bonding with the lip seal portion 176. Further, it should be noted that mechanical bonding can be accomplished by designing the body portion 175 with projections or recesses. In one exemplary embodiment, the undercut groove or recess 180 is cut into the body portion 175. The lip seal portion 176 can be press-fit into the undercut groove 180 to create a relatively right interference fit that relies on friction to bond the lip seal portion 176 to the body portion 175. Alternatively, the lip seal portion 176 can be injection molded into the undercut groove 180 to bond the lip seal portion 176 to the body portion 175.

In exemplary embodiments, chemical or adhesive bonding can be accomplished using a commercial bonding agent or adhesive applied to the body portion 175. The body portion 175 can then be press-bonded to the lip seal portion 176 or adhered through vulcanization to create a positive-substance bond having a high break-out value. In exemplary embodiments, bonding agents can comprise polymer/solvent coating solutions, with a primer coat based on phenolic-style resins and a topcoat formed from solutions of polymers and other materials. Water-based versions of bonding agents are also available. In exemplary embodiments, the selection of a bonding agent can be based upon the composition of the elastomeric lip seal portion 176. Application of the bonding agents typically involves the spraying of gray primer coat based on phenolic-style resins over a slightly wider area than the black topcoat of polymer solution, using a barrel spraying machine.

By obtaining a strong bond between the body portion 175 and the elastomeric lip seal portion 176 in the composite bushing 172, the body portion 175 operates to provide stiffness and to constrain the lip seal portion 176, thereby significantly increasing the resistance of the elastomeric material of the lip seal portion 176 to chemical attack and potential dimensional changes, such as swelling. This strength, durability, and dimensional stability enables the seal provided by the composite bushing 172 to prevent the escape of fluids and to prevent contaminants from entering the bore 181 in which the float arm 82 is disposed. The composite bushing 172 also allows for free rotation of the float arm 82 upon application of low torque forces. As described above, the exemplary composite bushing 172 is formed as an integral, unitary, and one-piece structure. It should be appreciated that the integral structure allows for ease of assembly. It should also be appreciated that the composite bushing 172 forms a seal around the float arm 82 while still allowing a wiper to be described to move freely in a dry environment.

Figure 6:
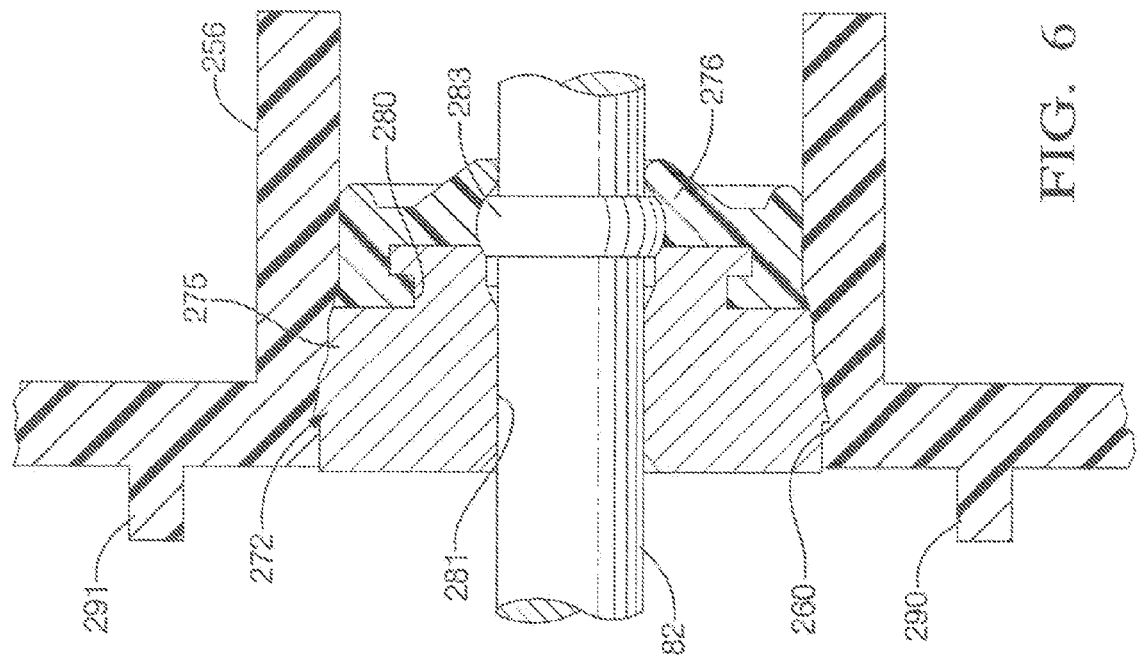
FIG. 6 is an enlarged, partial cross-sectional view of another exemplary embodiment of a composite bushing that can be incorporated into the sealed fuel level sensor of FIG. 1.

Referring now to FIG. 6, an enlarged, partial cross-sectional view of a bushing 272 that can be incorporated into an alternative exemplary embodiment of the sealed fuel level sensor 10 of FIGS. 1-4 is shown. The busing 272 is provided to receive a portion of the rotation float arm 82 that is coupled to a wiper assembly and to prevent leakage from the fuel module into the variable resistor assembly. The bushing 272 is configured to be disposed at least partially in an aperture 260 of the cover 256 of the sealed fuel level sensor 10. A primary difference between the cover 256 and the cover 56 described above, is that the cover 256 has a pair of posts 290, 291 for limiting a range of movement of the float arm 82. The bushing 272 includes an annular, rigid body portion 275, an annular, elastomeric lip seal portion 276. The lip seal portion 276 extends circumferentially about the aperture 260 and forms a seal against the float arm 82 inserted into a bore 281.

In an exemplary embodiment, the rigid body portion 275 is constructed from a material that exhibits dimensional stability when exposed to the harsh chemicals of fuel formulations. For example, the body portion 275 can be constructed from brass, carbon, stainless steels, bronze, aluminum, lead, polyamides, ceramics, or combinations thereof. In one exemplary embodiment, the body portion 275 has an undercut groove 280 thereon configured to receive a portion of the lip seal portion 276 therein for mechanically locking the body portion 275 to the lip seal portion 276.

The lip seal portion 276 is configured to receive an engagement flange 283 of the float arm 82 and to form a relatively tight seal against the float arm while allowing rotation of the float arm 82. The elastomeric lip seal portion 276 extends radially into the bore 281 and forms a relatively tight seal with the float arm 82 above the engagement flange 283. The lip seal portion 276 is constructed from an elastomeric material. It should be noted that the elastomeric material can also be a polymeric material. The elastomeric material can have a wide temperature range and provide relatively good chemical resistance to gasoline, diesel fuels, and other fuel formulations. For example, the lip seal portion 276 can be constructed from one or more of flourocarbon elastomers (such as Viton.RTM., Technoflon.RTM., Flourel.RTM., and Kel-F.RTM.), hypalon. flourosilicones, nitriles (such as Buna-N, Hydroginated Nitrile, and Carboxylated Nitrile), epichlorohydrin perfluoroelastomer, or combinations thereof.

A strong bond between the rigid body portion 275 and the elastomeric lip seal portion 276 of the composite bushing 272 can be achieved with mechanical bonding and/or chemical adhesive. For example, in one exemplary embodiment, the rigid body portion 275 is mechanically joined by injection-molding or press-bonding with the lip seal portion 276. Further, it should be noted that mechanical bonding can be accomplished by designing the body portion 275 with projections or recesses. In one exemplary embodiment, the undercut groove or recess 280 is cut into the body portion 275. The lip seal portion 276 can be press-fit into the undercut groove 280 to create a relatively right interference fit that relies on friction to bond the lip seal portion 276 to the body portion 275. Alternatively, the lip seal portion 276 can be injection molded into the undercut groove 280 to bond the lip seal portion 276 to the body portion 275.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitation of quantity, but rather denote the presence of at least one of the referenced item.

What is claimed is:

1. A sealed fuel level sensor for a fuel tank, comprising:
   a frame having a cavity therein;
   a variable resistor disposed in the cavity and operatively supported by the frame;
   a wiper disposed in the cavity for rotation relative to the variable resistor and for contacting the variable resistor;
   a cover connected to the frame to enclose the cavity, the cover including an aperture extending therethrough;
   a bushing disposed within the aperture, the bushing having an annular body portion disposed about an axis and a coaxial annular lip seal portion affixed to the body portion wherein the lip seal portion covers an axial end surface of the body portion and peripherally encircles a portion of the outer peripheral surface of the body portion, the lip seal portion and the body portion having an axial bore therethrough;

a float arm having an end extending through the aperture of the cover and the bore of the bushing and connected to the wiper, the lip seal portion engaging the float arm to form a seal; and a float connected to the float arm such that the float moves the float arm and the wiper relative to the variable resistor as a level of fuel increases and decreases in the fuel tank.

2. The sealed fuel level sensor of claim 1, wherein the lip seal portion is an elastomeric lip seal portion.

3. The sealed fuel level sensor of claim 2, wherein the elastomeric lip seal portion is constructed from at least one of a fluorocarbon, a fluorosilicon, a nitrile, a hypalon, an epichlorohydrin, and an a perfluoroelastomer.

4. The sealed fuel level sensor of claim 2, wherein the elastomeric lip seal portion is chemically treated with an adhesive to bond the elastomeric lip seal portion to the body portion.

5. The sealed fuel level sensor of claim 1, wherein the body portion has an undercut groove thereon configured to receive a portion of the lip seal portion therein for mechanically locking the body portion to the lip seal portion.

6. The sealed fuel level sensor of claim 1, wherein the body portion is constructed from at least one of brass, carbon, stainless, steel, and a ceramic material.

7. The sealed fuel level sensor of a fuel tank, comprising;
a frame having a cavity therein;
a variable resistor disposed in the cavity and operatively supported by the frame; a wiper disposed in the cavity for rotation relative to the variable resistor and for contacting the variable resistor;
a cover connected to the frame to enclose the cavity, the cover including an aperture extending therethrough
a bushing disposed within the aperture. the bushing having a body portion and a lip seal portion disposed on the body portion. the lip seal portion and the body portion having a bore
a float arm having an end extending through the aperture of the cover and the bore of the bushing arid connected to the wiper, the lip seal portion engaging the float arm to form a seal; and
a float connected to the float arm such that the float moves the float arm and the wiper relative to the variable resistor as a level of fuel increases and decreases in the fuel tank:
wherein the bushing further has a pair of posts extending outwardly and spaced radially to limit movement of the float arm.

8. A sealed fuel level sensor for a fuel tank, comprising:
a frame having a cavity therein;
a variable resistor disposed in the cavity and operatively supported by the frame;
a wiper disposed in the cavity for rotation relative to the variable resistor and for contacting the variable resistor;
a cover connected to the frame to enclose the cavity, the cover including an aperture extending therethrough;
a bushing disposed within the aperture, the bushing having an annular metallic body portion disposed about an axis and a coaxial elastomeric lip seal portion affixed to the body portion wherein the lit seal portion covers an axial end surface of the body portion and peripherally encircles a portion of the outer peripheral surface of the body portion, the elastomeric lip seal portion and the metallic body portion having an axial bore therethrough:
a float arm having an end extending through the aperture of the cover and the bore of the bushing and connected to the wiper, the elastomeric lip seal portion engaging the float arm to form a seal; and
a float connected to the float arm such that the float moves the float arm and the wiper relative to the variable resistor as a level of fuel increases and decreases in the fuel tank.

9. The sealed fuel level sensor of claim 8, wherein the elastomeric lip seal portion is constructed from a polymeric material.

10. A sealed fuel level sensor for a fuel tank, comprising:
a frame having a cavity therein;
a variable resistor disposed in the cavity and operatively supported by the frame;
a wiper disposed in the cavity for rotation relative to the variable resistor and for contacting the variable resistor;
a cover connected to the frame to enclose the cavity, the cover including an aperture extending therethrough;
a bushing disposed within the aperture, the bushing having a body portion, a lip seal portion disposed on a first end of the body portion, and a flange portion disposed on a second end of the body portion, the lip seal portion and the body portion and the flange portion having a bore extending therethrough, the flange portion having a pair of posts extending outwardly to limit movement of a float arm;
the float arm having an end extending through the aperture of the cover and the bore of the bushing and connected to the wiper, the lip seal portion engaging the float arm to form a seal; and
a float connected to the float arm such that the float moves the float arm and the wiper relative to the variable resistor as a level of fuel increases and decreases in the fuel tank.

11. A sealed fuel level sensor for a fuel tank, comprising:
a frame having a cavity therein;
a variable resistor disposed in the cavity and operatively supported by the frame;
a wiper disposed in the cavity for rotation relative to the variable resistor and for contacting the variable resistor;
a cover connected to the frame to enclose the cavity, the cover including an aperture extending therethrough, the cover having a pair of posts extending outwardly to limit movement of a float arm;
a bushing disposed within the aperture, the bushing having a body portion and a lip seal portion disposed on the body portion, the lip seal portion and the body portion having a bore therein;
the float arm having an end extending through the aperture of the cover and the bore of the bushing and connected to the wiper, the lip seal portion engaging the float arm to form a seal; and
a float connected to the float arm such that the float moves the float arm and the wiper relative to the variable resistor as a level of fuel increases and decreases in the fuel tank.

* * * * *